United States Patent [19]
Glover

[11] Patent Number: 5,686,908
[45] Date of Patent: Nov. 11, 1997

[54] WIND SHEAR DETECTOR WITH SLOW SHEAR BIAS

[75] Inventor: J. Howard Glover, Bellevue, Wash.

[73] Assignee: AlliedSignal, Inc., Morristown, N.J.

[21] Appl. No.: 629,858

[22] Filed: Apr. 9, 1996

Related U.S. Application Data

[63] Continuation of Ser. No. 239,487, May 9, 1994, abandoned, which is a continuation of Ser. No. 930,005, Aug. 13, 1992, Pat. No. 5,379,035, which is a continuation of Ser. No. 508,311, Apr. 10, 1990, Pat. No. 5,187,477.

[51] Int. Cl.⁶ .................................................. G08B 23/00
[52] U.S. Cl. ........................................ 340/968; 340/963
[58] Field of Search ...................................... 340/963, 968, 340/949; 364/434; 73/178 T, 170.02, 170.11; 342/26

[56] References Cited

U.S. PATENT DOCUMENTS

| | | | |
|---|---|---|---|
| 4,079,905 | 3/1978 | Greene | 340/968 |
| 4,725,811 | 2/1988 | Muller et al. | 340/968 |
| 4,797,674 | 1/1989 | Zweifel | 340/968 |
| 4,855,738 | 8/1989 | Greene | 340/968 |
| 4,857,922 | 8/1989 | Miller et al. | 340/968 |
| 4,863,120 | 9/1989 | Zwiefel | 244/175 |
| 4,891,642 | 1/1990 | Muller | 340/968 |
| 5,119,091 | 6/1992 | Zweifel | 340/968 |
| 5,187,477 | 2/1993 | Glover | 340/968 |
| 5,379,035 | 1/1995 | Glover | 340/968 |

FOREIGN PATENT DOCUMENTS 0-125-087  11/1984  European Pat. Off. .

Primary Examiner—Brent A. Swarthout

[57] ABSTRACT

A wind shear detector provides an alert to the pilot of an aircraft upon the occurrence of a sustained low-level increasing performance shear if the shear occurs for a sufficiently long period of time, even if the shear is of a relatively low magnitude. An integrator is provided to integrate signals representative of low-level increasing performance shears and to provide the alert if the accumulated energy caused by the shear exceeds a predetermined level. The integrated low-level shear signal may be combined with currently occurring shear signals and the alert generated if the combination of current increasing performance shear signals and the integrated shear signal exceeds a predetermined level.

14 Claims, 1 Drawing Sheet

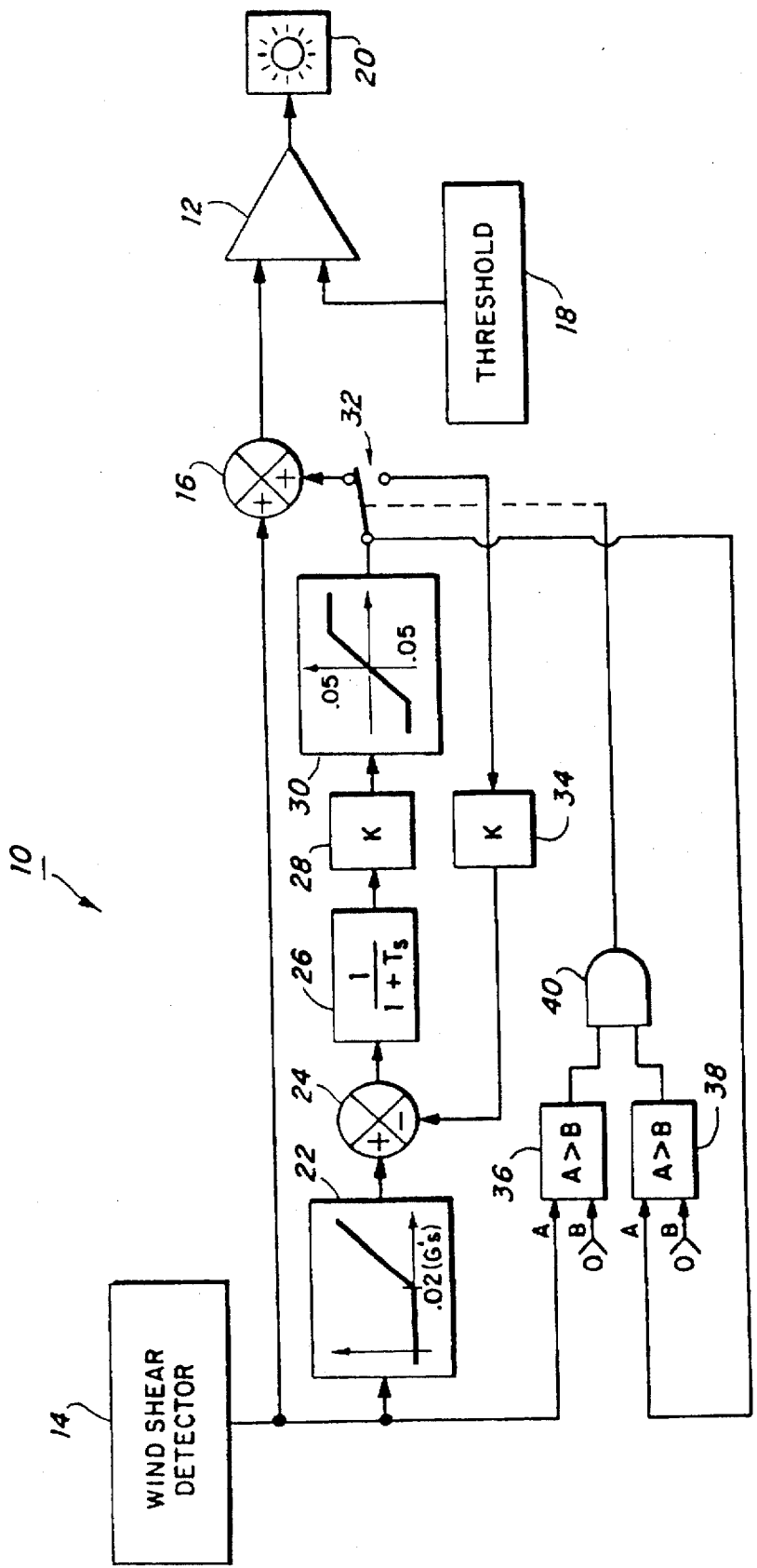

WIND SHEAR DETECTOR WITH SLOW SHEAR BIAS

This is a continuation of Ser. No. 08/239,487, filed May 9, 1994, now abandoned, which is a continuation of application Ser. No. 07/930,005, now U.S. Pat. No. 5,379,035, filed Aug. 13, 1992, which is a continuation of Ser. No. 508,311, filed Apr. 10, 1990, now U.S. Pat. No. 5,187,477.

BACKGROUND OF THE INVENTION

1. Field of the Invention

This invention relates generally to wind shear warning instruments, and more particularly to wind shear warning instruments that provide an advisory message to a pilot upon the occurrence of a condition indicating that a wind shear is probable.

2. Description of the Prior Art

Various wind shear warning systems are known. Typical prior art systems are disclosed in U.S. Pat. Nos. 4,725,811 and 4,891,642 and in U.S. patent application Ser. No. 07/034,807, filed Apr. 3, 1987, now U.S. Pat. No. 4,905,000, all assigned to the same assignee as the assignee of the present invention.

While the systems described in the above-mentioned patents and application do provide a wind shear indication, the systems described in the above mentioned patents are designed not to respond to low level wind shears in order to avoid nuisance warnings, and consequently, can detect a wind shear only after a wind shear situation of a predetermined magnitude has been encountered. The system described in the above-referenced application does not require that a wind shear of a particular magnitude be encountered before a warning is generated, but predicts the probability of a wind shear based upon geographic position and temperature and barometric pressure conditions, and permits warnings to be generated earlier upon the occurrence of a condition where wind shear is more probable.

While the above-described systems do provide a way to provide wind shear warnings based upon the magnitude of the wind shear alone or in conjunction with other parameters, there are parameters other than those disclosed in the systems discussed above that can be monitored to indicate the probability of a wind shear.

SUMMARY

Accordingly, it is an object of the present invention to overcome many of the disadvantages of the prior art systems.

It is another object of the present invention to provide a wind shear warning instrument that anticipates the occurrence of a wind shear.

It is another object of the present invention to provide a wind shear alerting system that monitors slow, long duration, increasing performance shears and provides a message indicating that a decreasing performance shear is probable if the slow increasing performance shear persists for a sufficiently long time period.

It is another object of the present invention to monitor increasing performance wind shears to provide a message indicating a decreasing performance shear is probable if an increasing performance shear is present and if the combination of the accumulated energy and magnitude of the increasing performance shear exceeds a predetermined level.

It has been found that a long duration low level positive performance shear often precedes a sudden decreasing performance shear. Thus, according to the invention, long duration, positive performance shears are monitored and the positive performance shear signal is integrated to provide an indication of the total accumulated energy of the positive performance shear. If the total accumulated energy exceeds a predetermined amount, for example 0.2 G, this is an indication that a decreasing performance shear is possible. If the combination of the accumulated energy and magnitude of an increasing performance shear exceeds a predetermined value, for example, 0.1 G, when an increasing performance shear is present, this also indicates that a decreasing performance shear is possible. Consequently, upon the occurrence of a sustained increasing performance shear, an advisory message is issued to the pilot to indicate to the pilot a possible wind shear condition if the accumulated energy of the shear or if the combination of the accumulated shear and the magnitude of the increasing performance shear exceeds a predetermined level.

BRIEF DESCRIPTION OF THE DRAWING

These and other objects and advantages of the present invention will become readily apparent upon consideration of the following detailed description and attached drawing, wherein:

The single FIGURE of the drawing is a block diagram of the wind shear system according to the invention.

DETAILED DESCRIPTION OF THE PREFERRED EMBODIMENT

The slow shear detection system according to the invention, generally designated by the reference numeral 10, provides an alert upon the occurrence of a low level shear, particularly a positive or increasing performance shear, that may slowly build to high a level and be followed by a negative or decreasing performance shear. The alert is provided by a comparator 12 that compares a combination of the accumulated positive shear from the circuit 10 and a wind shear signal from a wind shear detector 14 via a summing junction 16 with a signal from a threshold circuit 18. The comparator 12 activates an alert annunciator 20, which may be an audible or a visual alert, preferably a visual alert, when the combined shear signal from the summing junction 16 exceeds the threshold signal from the threshold circuit 18 to indicate the possibility of an impending negative shear condition.

The summing junction 16 receives a slow shear signal from the slow shear circuit 10 and combines it with the shear signal from the wind shear detector 14. The purpose of the slow shear bias circuit is to provide an alert when a slow but long duration increasing performance shear above a certain level is detected. The alert may be provided based on only the slow shear signal from the circuit 10, or based on a combination of the slow shear signal from the circuit 10 and the shear signal from the wind shear detector 14 that appears at the output of the summing junction 16.

Investigations of several shear related accidents have shown that slow increasing performance shears can be followed by sudden decreasing performance shears. Thus, it is advantageous to provide an early alert to the pilot under these conditions. Consequently, in accordance with an important aspect of the invention, there is provided circuitry for detecting slow shears of long duration that would be difficult to detect without causing nuisance warnings. While slow shears, particularly increasing performance shears, do not appear to pose a threat to the aircraft, if such shears persist for a sufficiently long time, the total energy of the aircraft can be significantly changed. In particular, a slow increasing performance shear that persists for a sufficiently long time can make the aircraft dependent upon the increasing energy provided by the increasing performance shear so that upon a cessation of the increasing performance shear, the air speed of the aircraft will be insufficient to sustain flight.

One wind shear related accident reported in the NTSB Accident Report NTSB-AAR-78-2 resulted from such a shear. In this accident, the onset of the negative energy phase of the incident was very sudden and encountered at very low altitude. The location of the core of the microburst was close to the runway threshold, and a wind shear warning based on decreasing energy would have provided very little time for the crew to react. However, the strong outflow from the microburst produced a large increase in head wind from 12.5 knots of head wind at the outer marker to greater than 50 knots of head wind at the middle marker while the aircraft was on approach. The loss of this head wind when the aircraft neared the core of the microburst was a contributing cause of the accident. The head wind increase correspond to an average positive energy shear of only approximately 0.25 knots per second (0.013 g), a magnitude normally insufficient to justify an alert. However, the total energy change to the aircraft during the approach was significant, and contributed to the accident.

It has been found that a change in aircraft energy resulting from such slow shears can be computed by integrating the wind shear, with suitable non-linear filtering to prevent unwanted alerts, if desired. One implementation for integrating slow shears and providing a slow shear bias signal to reduce the alert threshold to provide an earlier alert warning to the pilot is illustrated in the drawing. The slow shear circuit 10 detects long duration positive performance slow shears to determine the total change in energy, and alters the warning threshold as a function of the total or accumulated change in energy to provide an alert to the pilot when a substantial total change in increasing energy performance has occurred.

The circuit 10 operates as a non-linear, long time constant integrating circuit with a rapid washout. The circuit 10 employs a threshold circuit 22, a summing junction 24, a low pass filter or integrator 26, a gain block 28, a limiter 30, a switch 32 and a gain block 34, and operates as a long time constant integrator when the switch 32 is in the position shown in the FIGURE. In addition, a pair of comparators 36 and 38 and an AND gate 40 control the position of the switch 32 to change the operation of the circuit 20 from the integrating mode to a rapid washout mode under appropriate conditions, as discussed below.

In operation, the circuit 40 receives a filtered shear signal from the wind shear detector 14 and applies it to the threshold circuit 22. Wind shear detectors suitable for use as the wind shear detector 14 are described in the aforementioned U.S. Pat. Nos. 4,725,811 and 4,891,642. These systems compare inertially derived and airmass derived accelerations or velocities and provide an indication of wind shear upon the occurrence of a disparity between the inertially and airmass derived parameters. The function of the threshold circuit 22 is to respond only to positive shears that exceed a predetermined magnitude, for example, on the order of positive 0.02 G to reduce nuisance warnings. The output of the threshold circuit 22 is applied to the summing junction 24 whose output is in turn connected to the integrating filter 26 that serves to integrate the shear signal over a long time constant, for example, on the order of 50 seconds. The integrated shear signal from the filter 26 is then amplified by the gain block 28 and is applied to the limiter 30 which limits the maximum value of the shear signal to limit the maximum amount of bias that can be produced by the circuit 10. In the illustrated embodiment, the limiter 30 limits the value of the accumulated shear signal to ±0.05 G, but other values may be used. The output of the switch 32 is applied to the summing junction 16 to be combined with the signal from the wind shear detector 14 to provide an alert to provide earlier alerts in the presence of a substantial total change in increasing performance energy. In the embodiment illustrated in the FIGURE, an alert is generated when the sum of the integrated energy signal from the limiter 30 and the signal from the wind shear detector 14 exceeds a predetermined level, for example, positive 0.1 G. Alternatively, the accumulated energy may be used to generate the alert by itself without an input from the wind shear detector 14. In an embodiment that utilizes only accumulated wind shear to generate the warning, the summing junction 16 and the limiter 30 would be eliminated, and the output of the gain block 28 would be connected directly to the armature of the switch 32. The output of the switch 32 that is shown connected to the summing junction 16 in the FIGURE would be connected to the comparator 12. In such an embodiment, the alert is preferably generated at a higher level, for example, at 0.2 G of accumulated energy.

It is desirable to continue integrating the filtered shear signal for as long as the shear signal indicates an increasing performance shear to accumulate the total change in the increasing performance energy generated during that shear. However, upon the cessation or reversal in polarity of the shear, it is desirable to wash out the integrated signal rapidly to zero so that integration can be resumed from zero (or another known datum) upon the occurrence of the next encountered positive shear. This is accomplished by the switch 32 which is under control of the AND gate 40.

The inputs to the gate 40 are from the two comparators 36 and 38. The comparator 36 receives the filtered shear signal from the wind shear detector 14 and compares it with zero to determine if the shear is a positive shear. The comparator 38 compares the output from the limiter 30 (or gain block 28 in the alternative embodiment) with zero to determine if the total integrated energy is greater than zero. If both the shear signal and the integrated shear signal are greater than zero, the AND gate 40 is enabled and causes the switch 32 to be in the position shown to place the circuit 10 into the integrating mode. However, if the shear signal reverses polarity, the switch 32 will be switched to the opposite pole to cause the output of the limiter 30 to be applied to the gain block 34 and thence to a negative input of the summing junction 34. This will quickly discharge or wash out the accumulated positive energy stored in the filter 26, preferably at a rate of 5 to 10 times faster than the charging or accumulation rate. Once the filter 26 has been discharged, the circuit 10 will be returned to its integrating mode upon the next occurrence of a positive shear.

Obviously, many modifications and variations of the present invention are possible in light of the above teachings. Thus, it is to be understood that, within the scope of the appended claims, the invention may be practiced than as specifically described above.

What is claimed and desired to be secured by Letters Patent of the United States is:

I claim:

1. A wind shear warning instrument for an aircraft, comprising:

means for providing signals representative of wind shear encountered by the aircraft;

means responsive to said providing means for integrating only those wind shear representative signals which are representative of increasing performance wind shear energy and providing a signal representative of the accumulated increasing performance due to wind shear encountered by the aircraft and for terminating integration upon occurrence of a decreasing performance wind shear; and means for monitoring said accumulated increasing performance representative signal and generating an alert whenever the accumulated increasing performance representative signal exceeds a predetermined magnitude.

2. A wind shear warning instrument as recited in claim 1 wherein said predetermined magnitude required to generate an alert is on the order of approximately 0.2 G.

3. A wind shear warning instrument as recited in claim 1 wherein said integrating means includes means for non-linearly integrating the increasing performance wind shear energy.

4. A wind shear warning instrument as recited in claim 3 wherein said integrating means includes a threshold circuit for preventing the integration of increasing performance wind shear energy having a magnitude below a predetermined level.

5. A method for advising the pilot of an aircraft of an incipient decreasing performance wind shear, comprising:

monitoring wind shear conditions to provide indications of increasing and decreasing performance wind shears;

integrating the indications of increasing performance wind shears over time to provide an integrated wind shear indication and terminating integration upon occurrence of a decreasing performance wind shear; and generating a message advising the pilot when the integrated wind shear indication exceeds a predetermined magnitude.

6. The method recited in claim 5 wherein said predetermined magnitude is on the order of approximately 0.2 G.

7. A wind shear warning instrument for an aircraft, comprising:

means for providing signals representative of wind shear encountered by the aircraft;

means responsive to said providing means for integrating those wind shear signals representative of increasing performance wind shear and providing a signal representative of the accumulated increasing performance wind shear encountered by the aircraft and for terminating integration upon occurrence of a decreasing performance wind shear; and means for combining said accumulated increasing performance representative signal and said wind shear representative signals and generating an alert whenever the combination of the accumulated increasing performance wind shear representative signal and the wind shear representative signals exceed a predetermined magnitude.

8. A wind shear warning instrument as recited in claim 7 wherein said predetermined magnitude is on the order of 0.1 G.

9. A wind shear warning instrument as recited in claim 7 wherein said integrating means includes means for non-linearly integrating the increasing performance wind shear representative signals.

10. A wind shear warning instrument as recited in claim 9 wherein said integrating means includes a threshold circuit for preventing the integration of an increasing performance wind shear representative signal having a magnitude below a predetermined level.

11. A method for advising the pilot of an aircraft of an incipient decreasing performance wind shear, comprising:

monitoring wind shear conditions to provide indications of increasing performance wind shears;

integrating the indications of increasing performance wind shears over time to provide a signal representative of the accumulated increasing performance due to wind shear encountered by the aircraft and for terminating integration upon occurrence of a decreasing performance wind shear; and generating a message advising the pilot when the accumulated increasing performance representative signal exceeds a predetermined magnitude.

12. The method recited in claim 11 wherein said predetermined magnitude is on the order of approximately 0.2 G.

13. A wind shear warning instrument for an aircraft, comprising:

means for providing signals representative of wind shear encountered by the aircraft;

means responsive to said providing means for integrating those wind shear signals representative of increasing performance wind shears and providing a signal representative of the accumulated increasing performance wind shear encountered by the aircraft and for terminating integration upon occurrence of a decreasing performance wind shear;

means for monitoring said wind shear representative signals and generating an alert whenever the wind shear representative signals are representative of an increasing performance shear that exceeds a predetermined magnitude; and means for reducing the value of the predetermined magnitude required to generate the alert as a function of the magnitude of the accumulated increasing performance shear representative signal.

14. A method for advising the pilot of an aircraft of an incipient decreasing performance wind shear, comprising:

monitoring wind shear conditions to provide indications of increasing performance wind shears;

integrating the indications of increasing performance wind shears over time to provide an integrated wind shear indication and terminating integration upon occurrence of a decreasing performance wind shear;

generating a message advising the pilot when the wind shear indication is representative of an increasing performance shear in excess of a predetermined magnitude; and reducing the predetermined magnitude required to generate a message in proportion to the magnitude of the integrated wind shear indication.

* * * * *